United States Patent [19]

Easter, II

[11] 4,374,804
[45] Feb. 22, 1983

[54] CONTROLLED SLUDGE COMPOSTING SYSTEM

[76] Inventor: James M. Easter, II, P.O. Box 23, Owings Mills, Md. 21117

[21] Appl. No.: 176,197

[22] Filed: Aug. 7, 1980

[51] Int. Cl.³ .............................................. B01J 1/00
[52] U.S. Cl. .................................. 422/184; 422/229; 422/232; 435/291; 435/309; 435/813; 435/819; 71/9
[58] Field of Search ........................................ 71/8–11; 422/184, 229, 232; 435/291, 300, 309, 813, 819; 210/149, 257.1, 262, 613; 55/133

[56] References Cited

U.S. PATENT DOCUMENTS 3,294,491 12/1966 Brown .................................. 71/9 X
4,062,770 12/1977 Kneer .................................. 71/9 X
4,135,908 1/1979 Widmer .................................. 71/9

Primary Examiner—Ferris H. Lander
Attorney, Agent, or Firm—Walter G. Finch

[57] ABSTRACT

The invention is a controlled system for composting sludge to a useable state. The method of the system eliminates the usual objectionable odors. The system consists of a thorough mixing of the sludge with carbonaceous material, layering the mixture in a silo and moving it through the silo on a timed interval basis, forcing air through the mixture in the silo to promote the composting action by an aerobic bacteria process, periodically withdrawing the treated material in a manner compatible with the timed interval basis, further layering the composted material in a second silo having a forced air means to complete the treatment process, and withdrawing the final treated material for packaged or for bulk distribution to users.

10 Claims, 4 Drawing Figures

CONTROLLED SLUDGE COMPOSTING SYSTEM

BACKGROUND AND SUMMARY OF THE INVENTION

The invention relates to sludge treatment and in particular to sludge treatment systems to produce a composted material for agricultural and other similar uses. Specifically, the invention relates to a controlled sludge treatment system that eliminates objectionable odors and provides a useable composted product.

Sewage sludge accumulates at a rapid rate and in areas of large population the disposal becomes a problem. This is particularly so because the raw sludge from the sewage treatment plants has a distinct objectionable and disagreeable odor. This system of this invention provides a means for handling that sludge, eliminating the objectionable odor, and producing a useable product that makes the system economically feasible.

The system described herein is for an ordinary unit. It is to be understood that the system may be constructed in a range of sizes to handle a range of volumes, or the system may be constructed as a plurality of similar sized units to handle the total volume of sludge generated.

In the prior art sludge was disposed of by merely dumping it with a result of complaints about the disagreeable and objectional odor. Also, the raw sludge was not readily suitable for direct application to form land, flower beds, and similar uses in its untreated state.

Field treatment in the prior art has been tried in order to obtain a compost material, but this still had the problem of the disagreeable and objectionable odors.

Some treatment systems tried a digester means in order to capture certain gases that were useable, but this did not fully treat the sludge for agricultural use.

The present system of this invention overcomes the aforementioned problems of the prior art. The present invention thoroughly premixes the sludge with carbonaceous material and conveys it to a silo where it is spread evenly over the interior area in a layering manner by a movable distribution means. A timed interval moves the mixture through the silo in a specified period as more layers are added at the top and an equivalent volume (less the amount consumed in the composting process) is removed from the bottom by movable pick-up means.

The partially treated mixture is then conveyed to a second silo and spread, moved at a timed interval, and removed in a similar manner and packaged or bulkhandled for distribution to the user.

In both silos a forced air system passes air through the mixture mass. In the first silo to promote aerobic bacteria action for the composting and in the second silo to complete the process which eliminates the objectionable odors.

It is, therefore, an object of the invention to provide a controlled sludge composting system which will prepare raw sewage sludge for safe disposal and agricultural type uses.

It is another object of the invention to provide a controlled sludge composting system that removes objectionable disagreeable odors from the sludge in its final composted form.

It is also an object of the invention to provide a controlled sludge composting system that uses carbonaceous material as a mixture with the sludge to obtain a composted product.

It is still another object of the invention to provide a controlled sludge composting system that uses forced air to promote aerobic bacteria action in producing the composted end product.

It is yet another object of the invention to provide a controlled sludge composting system that uses forced air to complete the sludge treatment to eliminate disagreeable objectionable odors.

Further objects and advantages of the invention will become more apparent in the light of the following description of the preferred embodiments.

DESCRIPTION OF THE PREFERRED EMBODIMENTS

Figure 1:
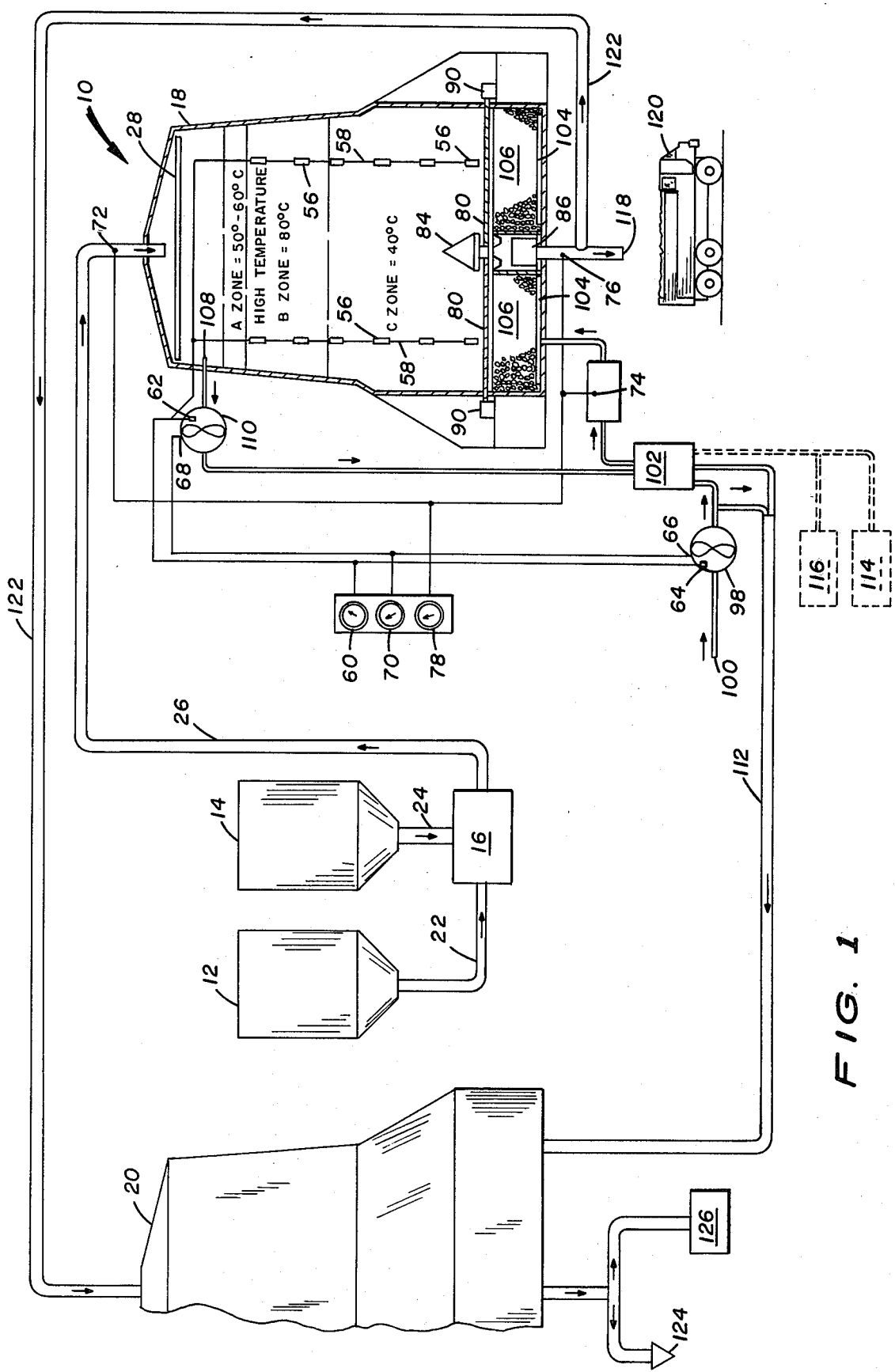
FIG. 1 is a schematic layout of a controlled sludge composting system.

Referring to the drawings and particularly to FIG. 1, a controlled sludge composting system is shown at 10.

The controlled sludge composting system 10 consists of a sludge supply means 12, a composting agent storage means 14, a mixing means 16, at least one first silo means 18, at least one second silo means 20, and associated conveying means, distribution means, retrieval means, discharge means, and control means to be described hereinafter in relation to the sludge supply means 12, composting agent storage means 14, mixing means 16, and first and second silo means 18 and 20 respectively.

As sludge is received from waste treatment plants, by truck, conveyor, or other means, it is deposited in the sludge supply means 12. The sludge supply means 12 can be in the form of a tank, hopper, or other suitable container to store the sludge for compounding with other ingredients as described hereinafter.

In a like manner, composting agents being received at the controlled sludge treatment system 10 are stored in the composting agent storage means 14 for later compounding with the aforementioned sludge.

Sludge from the sludge supply means 12 is transported via associated conveying means 22 to the mixing means 16, and composting agents from the composting agents storage means 14 are transported via associated conveying means 24 to the mixing means 16.

The sludge and the composting agent are thoroughly mixed in the mixing means 16 and then conveyed via conveying means 26 to first silo means 18.

The composting agent is primarily wood chips, reduced to a dimension approximately three-eighth of an inch across. Longer chips are not desirable as at the conclusion of the process it may be necessary to screen out larger particles that have not been assimilated into the final compost product by the process. The wood chips may also be in the form of sawdust. The wood chips, as will be described later, are added as a carbonaceous ingredient for the composting process. In addition to wood chips or sawdust, other materials may be added for the purpose, such as ground sugar cane stalks, corn stalks, and corn cobs, ground leaves, peanut hulls, shredded paper in cut bits, and other types of carbonaceous material.

The first silo 18 is the main composting means for the process. As noted, the controlled sludge composting system contains at least one first silo 18. For large volume production, the first silo 18 may be built as a twin silo as later described herein. Also, there may be a plurality of first silos 18 if the volume of sludge to be composted warrants such a facility. The system will be described for one first silo 18, with occasional reference to the plurality of first silos 18 where necessary.

Figure 3:
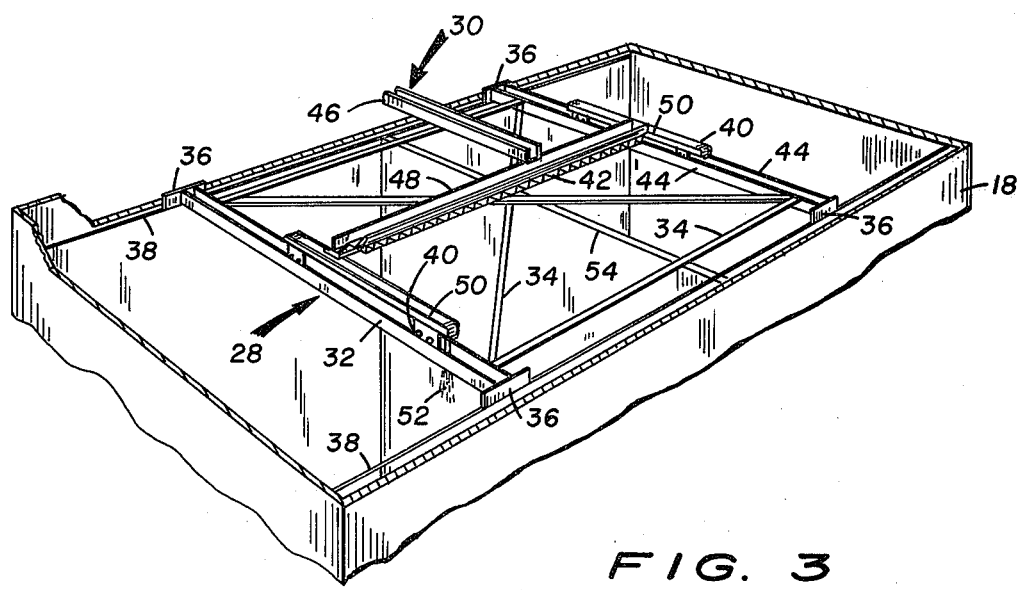
FIG. 3 is a partial pictorial view of a silo of a controlled sludge composting system, showing distribution means of the silo.

As the mixed sludge and composting agent enters the first silo 18 as a compound it is spread evenly over the total cross sectional area of the first silo 18. The even distribution is accomplished by a traveling type carrier means with a superimposed conveyor means thereon. FIG. 3 shows a partial pictorial view of first silo 18 with the roof portion of the structure cut away to show the traveling type carrier distributor means 28 with a superimposed conveyor means 30 thereon.

The traveling type carrier distributor means 28 consists of at least a pair of transverse support members 32, suitably connected together by bracing and strut members 34 and having a wheeled truck means 36 at each support location at the ends of transverse support members 32. The wheeled truck means 36 ride on and are supported by rails 38 suitably affixed to the first silo 18 structure. A pair of wheeled carriages 40, rigidly connected together centrally by strut structure 42, rides on rails 44 on the top side of transverse support members 32. Power means, not shown, provides power to move the wheeled truck means 36 longitudinally along rails 38. At the same time, power means, not shown, provides power to move the wheeled carriages 40 along the rails 44 on transverse support members 32.

The superimposed conveyor means 30 consists of first distribution conveyor means 46 which runs from a first swivel connection at the discharge point of conveying means 26 leading into to first silo 18, to a second swivel connection at the center of a second distribution conveyor means 48 which is mounted on the top most side of strut structure 42. The second distribution conveyor means 48 has discharge ends at each end thereof, for further discharge as hereinafter described, to a pair of third distribution conveyor means 50 which are mounted on the top most side of wheeled carriages 40. The third distribution conveyor means 50 have discharge ends at each end thereof, for further discharge as hereinafter described.

The mixed sludge and composting agent that is conveyed by conveying means 26, is discharged into first silo 18 by depositing the mixture on to the first distribution conveyor means 46 which transports the mixture to and deposits it on to the second distribution conveyor means 48. By suitable control means, the second distribution conveyor means 48 may be operated to discharge at either end thereof. In whichever direction it is programmed for or for which the controls are set manually, the second distribution conveyor means 48, which delivers to and deposits the mixture on to one of the third distribution conveyor means 50, may also be operated to discharge at either end thereof. In whichever direction it is programmed for or for which the controls are set manually, the third distribution conveyor means 50 delivers to and deposits the mixture into the first silo 18 by gravity flow 52.

By operation of the wheeled trucks 36 and the wheeled carriages 40 the gravity flow 52 can be distributed over the entire area of the interior of the first silo 18. This is done by control of the direction of the second and third distribution conveyor means 48 and 50 respectively so that the final discharge for gravity flow 52 may be at either end of the third distribution conveyor means 50. The matrix of gravity flow 52 points, established by the combination of second and third distribution conveyor means 48 and 50 directional movements and the concurrent transverse and longitudinal movements of wheeled carriages 40 and wheeled trucks 36 assures the even distribution and load of first silo 18. The control of the aforesaid directional movements, transverse movements, and longitudinal movements may be manual or programmed for automatic distribution.

Hereinbefore it was noted that first silo 18 (and similarly for second silo 20) may be individual silos, twin silos, or a plurality of adjacent silos. In FIG. 3 a center transverse wall 54 in first silo 18 indicates the structure for a twin silo arrangement. For a plurality of silos, adjacent structures would be formed in the longitudinal direction.

It is to be noted and understood that such twin silo arrangement and such plurality of silos is within scope and intent of this invention. It is to be further understood that the separate or single standing of silo structures is equally within the scope and intent of this invention.

Where twin silos or a plurality of adjacent silos is used, the traveling type carrier distribution means 28 with a superimposed conveyor means 30 thereon may be used. Such a dual use for twin silos is illustrated in FIG. 3 and the rails 38 could be extended for a plurality of adjacent silos.

As described hereinbefore, the even matrix-like distribution of gravity flow 52 points is important for the proper composting of the mixture of sludge and the composting agent. The evenly distributed layers move downward evenly, as hereinafter described, for the removal or retrieval of the composed materials. The movement is over a calculated and controlled period of time so that even distribution is important, should it not be an even distribution over the first silo 18 interior area, portions of the mixture may not be fully or properly composted at the end of the calculated and controlled period of time.

In FIG. 1 the traveling type carrier distribution means 28 is shown schematically, the details are shown in FIG. 3.

Note in FIG. 1 that sloping side walls are shown for the first silo 18 and the second silo 20. It is to be understood that straight or sloped walls for the silos 18 and 20 are within the scope and intent of the invention. Sloped walls are desirable to eliminate or reduce the possibilities of the mixture of materials bridging across the silo interior.

Rectangular shaped silos, square being one form, are most efficient for the top distributing mechanism and the bottom removal mechanism, however, it is to be understood that any other configuration is within the scope and intent of this invention.

Arrows in the conveying means 22, 24, and 26 as well as in other conveying means of materials, gases, and air subsequently described herein indicated the directional flow involved. Arrows to the first silo 18 indicate the flow of materials being composted, enters at the top, evenly layered as hereinbefore described, and moves downward. A similar downward movement occurs in second silo 20.

At the time which when the first silo is full and the composting process is in operation, the passage of the mixture will take 14 days to move from the top to the bottom for removal. This time controlled movement is based on the depth of the layers put in each day at the top and the amount taken out at the bottom. A controlling factor is the height of the material in the first silo 18 through which air can be forced to facilitate the bacterial action. If too high the air cannot be forced through, if too low the temperature cannot be properly controlled on the interior and control over the composting process is lost. Ideally, a height of material, evenly distributed at each deposit time as hereinbefore described, is about 33 feet.

At 33 feet the air can be forced through the mixture and the temperature can be adequately controlled at specific levels. At top three feet of the material, the level where it has most recently been added, the controlled temperature range is 50° to 60° C. Below this three feet is a high temperature zone where the controlled temperature is 80° C., the depth of the high temperature zone is 10 feet. Below the high temperature zone is a controlled temperature of 40° C. that is 20 feet in depth. Thus a total of 33 feet.

Referring to FIG. 1, these three zones are designated as A, B, and C, respectively, with the temperatures shown for each. Air is forced in over the entire cross-sectional area.

The cited depths for each zone and the temperatures have been found to be the optimum arrangement for the time period provided. It is to be understood that a variation from these depths, temperatures, and time period, that in combination accomplishes an equivalent composting of the sludge mixture, is within the scope and intent of this invention.

In order to control the temperatures in the zones as indicated, thermocouples 56 are affixed in the interior of the first silo 18 at a plurality of levels, six levels are shown in FIG. 1. Thermocouples 56 are also affixed at these levels but at a plurality of different cross sectional points 58 to obtain a mattrix of temperature readings at each level in the mixture being composted. Two such cross sectional points 58 are illustrated in FIG. 1.

The thermocouples 56 at points 58 are connected to a plurality of temperature readout dials 60 at a suitable control station. Only one temperature readout dial 60 of the plurality is shown in FIG. 1 for purposes of clarity.

In addition to the thermocouples 56 in the mixture being composted, thermocouples 62 and 64 are also located in the exhaust duct area and the fresh air intake area, respectively, and connected to similar readout dials 60. With the temperature information from the readout dials 60, the temperatures in Zones A, B, and C can be controlled manually or programmed for automatic control.

In a like manner, the $CO_2$ content of the incoming fresh air 66, and of the exhausted gases 68 is transmitted to readout dials 70 at the control station. Only one $CO_2$ readout dial 70 is shown for clarity. With the $CO_2$ information the bacteria activity in the mixture being composted can be ascertained.

In a similar manner, the moisture content 72 of the incoming mixture to the moisture content 74 of the silo, the incoming air to the silo, the moisture content 76 of the composted mixture leaving the first silo 18 is measured and transmitted to readout dials 78 at the control station. Only one readout dial 78 is shown for clarity. With the moisture content data the composting progress can be ascertained.

It is to be understood that other means of readout recording instead of the dials 60, 70, and 78 may be used, such as pen recording charts, multiple readings on a readout means, and other such arrangements are within the scope and intent of this invention.

As the composted material reaches the point where it is to be removed or retrieved, that is, at the bottom of first silo 18, it may be removed by various means. The present invention provides two alternatives. A single directional screw means and a dual directional screw means.

Figure 4:
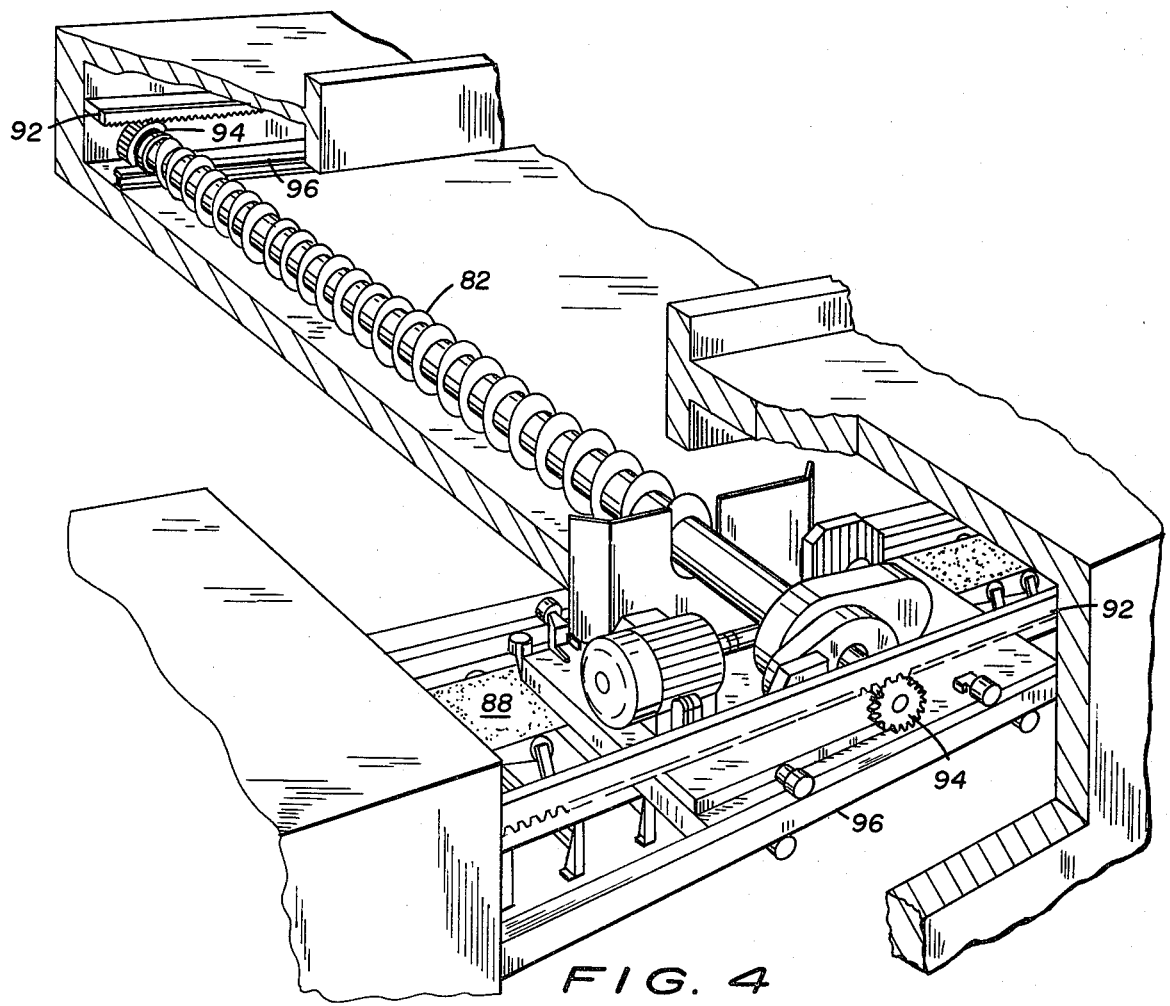
FIG. 4 is a partial pictorial view of a silo of a controlled sludge composting system, showing a removal means at the bottom of the silo.

In FIG. 1 the dual directional screw means 80 is shown and in FIG. 4 the single directional screw means 82 is shown. The dual directional screw means 80 is best suited for huge first silos 18 where the transverse dimension is very large. The single directional screw means 82 is best suited for smaller first silos 18 where the transverse dimension is moderate, about half or less of what a huge first silo 18 might be.

The dual directional screw means 80 will be described first: Twin or dual directional screw means 80 with opposite (or left and right) advancing spiral blades, respectively, revolve so as to "cut off" and transport a layer of composted material; that has reached the bottom of first silo 18, from the outside wall area of first silo 18 toward the center line of the first silo 18. The inboard ends of the dual directional screw means 80 are shielded or covered by a center deflecting structure 84. As the dual directional screw means 80 transport the composted material toward the center the composted material is thereby dumped or deposited into and on to the discharge conveying means 86. The discharge conveying means 86 has hopper or elongated longitudinal funnel-like chutes for each screw means that lead to a longitudinal conveying means (shown but not individually numbered). The discharge conveying means 86 then transports the composted material deposited on it to an exterior point for further distribution as hereinafter described.

The single directional screw means 82 shown in FIG. 4 has but one screw means with the blades advancing in one direction which "cuts off" and transports a layer of composted material, that has reached the bottom of first silo 18, from one side wall to the opposite wall in accordance with the direction of the advancing blade. As the transported material reaches the end of the screw it is likewise dumped into a hopper or elongated longitudinal funnel-like chute that leads to a longitudinal conveying means 88 along one wall only. The longitudinal conveying means 88 then transports the composted material deposited on it to an exterior point for further distribution (as for the dual directional screw means 80) and as hereinafter described.

Both the dual directional screw means 80 and the single directional screw means 82 operate on a rack and pinion system. The rack and pinion means system 90 for the dual directional screw means 80 moves the screw means 80 along the bottom of the composted material in the first silo 18 to cut or shove off a layer of the composted material by the rack and pinion means 90. As the layer is cut off and transported away as perviously described the composted material above settles into the area where composted material was removed. As layers are cut out and removed, space is provided at the top for the next layer of material to be added. The amount of material removed is controlled, along with the amount then added at the top to maintain the 14 day cycle of passage through the first silo 18.

In FIG. 4 the rack 92 and the pinion 94 on each side of the screw means 82 operates for the single directional screw means 82 in the same manner as the rack and pinion system 90 operates for the dual directional screw means 80. Both systems are operated by power means, the arrangement can be partially seen in FIG. 4, to cause the screw means 80 and 82 to move longitudinally along side rails 96 as seen in FIG. 4.

As noted previously, air is forced up through the mixture mass in the first silo 18 to activate the composting process. The system is shown in FIG. 1 where the air intake system 98 brings in fresh air at inlet 100, sends it through a heat exchanger 102 for preheating, then through a manifold means 104 for discharge through a bed of gravel or stone-like material 106 and thence upward, through the mixture being composted, over the entire area.

As the gases 108 are exhausted by exhaust means 110, the heated gas is piped down through the heat exchanger 102 to heat incoming air. It is to be noted that some of the gases have combustible qualities and may be used for heating purposes as well.

Several alternatives exist for disposing of the exhaust gases after passing through the heat exchanger 102. A portion can be mixed with fresh air and used to force air through the second silo 20, in the same arrangement as described for the first silo 18. A portion can be shunted 112 through piles of composted material that may be in storage to absorb odors or be mixed with fresh air or shunted through aeration tanks 114 to remove odors, either means serving as a filter. Or a portion can be shunted through charcoal filters 116 to remove odors before being exhausted to atmosphere.

As the composted material is removed by the discharge conveying means 86 and 88 it may be moved in two directions. It may be discharged through a hopper means 118 in bulk directly to transport means 120, such as highway trucks, rail cars, and the like for direct transport to areas such as farms. It is to be noted that at this point some odor is still involved and the bulk handling disposal must take this into consideration. Or, the composted material may be transported via conveyor means 122 to the second silo means 20.

In silo means 20 the principle operation is to remove the remaining odor, dry the material and prepare it for shipping, either in bulk or by bagging.

The operation of silo means 20 and time of passage therethrough is exactly like silo means 18, except that the plurality of thermocouples 56 is not as extensive. The details are not shown for silo means 20, but the arrangement is similar and an additional air supply may be received from the air intake system 98.

As the air passes through the composted material in silo means 20 it is essentially a slow cure. As it is discharged from the silo means 20 it may be shipped in bulk 124 or transported to a bagging station 126 for bagging or otherwise containerizing the composted material for shipment.

Regarding the control of the temperature, the temperature, based on the data received at temperature dials 60, is maintained by varying the air volume and pressure as dictated by the recorded temperatures, carbon dioxide, and moisture content, the latter two based on $CO_2$ dials 70 and moisture content dials 78 respectively.

The mix of the sludge and the composting agent must be adjusted so that the resulting mix has a 30 to 1 carbon-nitrogen ratio.

The $CO_2$ concentration as monitored on the $CO_2$ readout dials 70 is an indication of microbe activity, it is recorded and monitored carefully in the exhaust as hereinbefore described.

It is to be noted that the air to be passed through the composting mass is not a steady blowing of air. It may be intermittent, based on monitoring of both the $CO_2$ level and the temperature recordings. Manifold means 104 covers the entire area.

It is to be understood that more than one traveling type carrier distributor 28 with a superimposed conveyor means 30 may be used on the rails 38 when a plurality of adjacent silo means 18 or 20 are used. Also, it is to be understood that more than one dual directional screw means 80 or single directional screw means 82 may be used on the same side rails when operating under a plurality of adjacent silo means 18 or 20. Such variations are within the scope and intent of the present invention.

Figure 2:
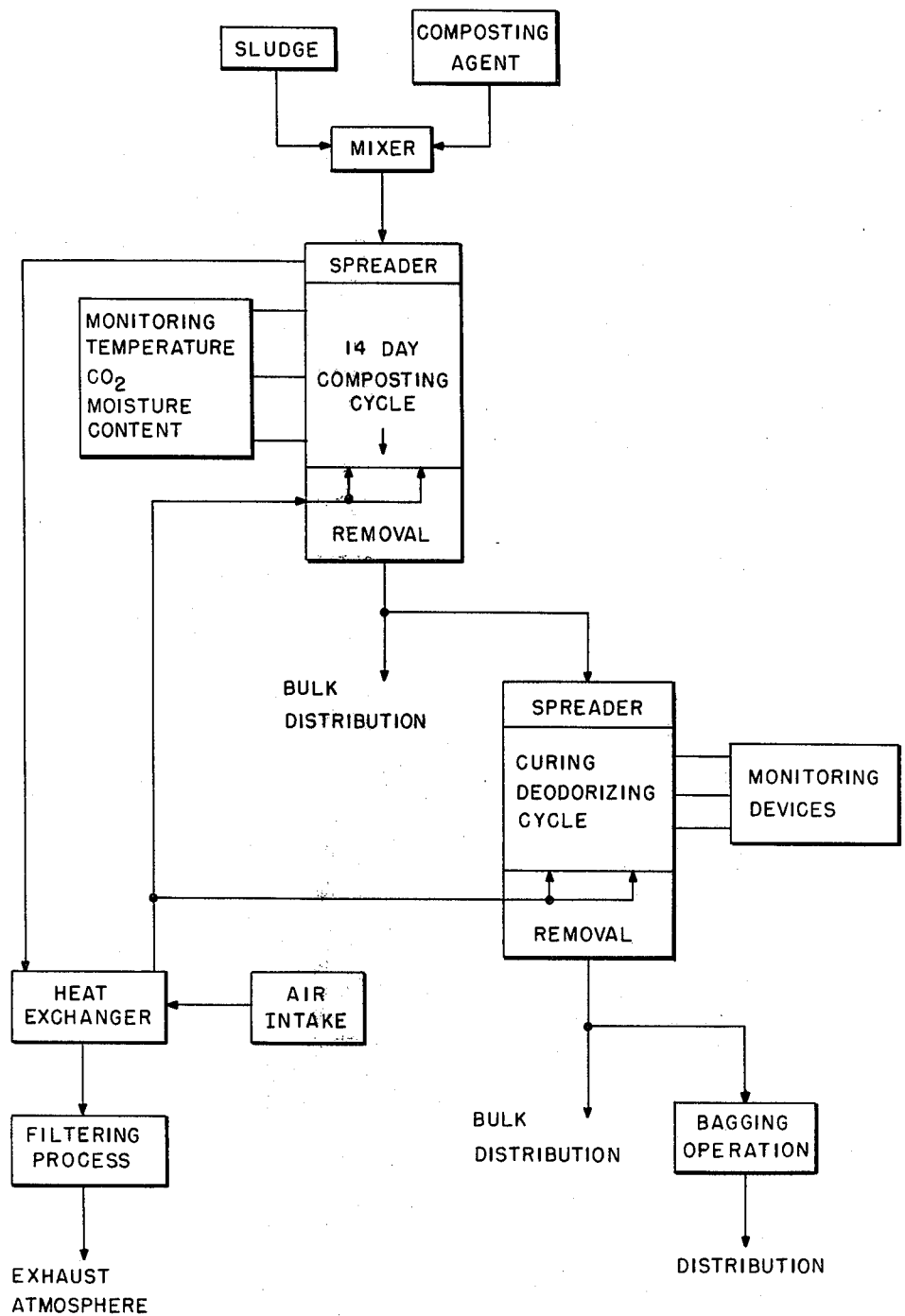
FIG. 2 is a diagrammatic layout of the process of a controlled sludge composting system.

FIG. 2 represents in chart form the process of controlled composting of sludge as hereinbefore described.

As can be readily understood from the foregoing description of the ivnention, the present structure can be configured in different modes to provide the ability to compost sludge.

Accordingly, modifications and variations to which the invention is susceptible may be practiced without departing from the scope and intent of the appended claims.

What is claimed is:

1. A controlled sludge composting system, comprising:

a sludge storage means, said sludge storage means containing and providing a quantity of sludge;

a composting agent storage means, said composting agent storage means containing and providing a quantity of composting agent;

a mixing means, said sludge storage means and said composting agent storage means being connected by a first and second conveying means, respectively, to said mixing means and communicating internally therewith and therebetween, a predetermined ratio of amounts of said sludge and said composting agent being received through said first and second conveying means, respectively, into said mixing means and being thoroughly mixed therein;

a first silo means, said mixing means being connected by a third conveying means to said first silo means and communicating internally therewith and therebetween, said predetermined ratio of amounts of said sludge and said composting agent being transferred to and discharged into the top end of said first silo means from said mixing means by said third conveying means after being thoroughly mixed in said mixing means;

a first material distribution means, said first material distribution means being located and installed within said first silo means at the uppermost end thereof, said first material distribution means having a first traveling carrier component, said first traveling carrier component being mounted and movably affixed within said first silo means so as to move longitudinally therewithin and having a first traveling carriage element mounted and movably affixed upon said first traveling carrier component so as to move transversely within said first silo and having a fourth conveyor means mounted and affixed upon said first traveling carriage element, said discharge of said mixture of said sludge and said composting agent into said first silo being directed to said fourth conveyor means, said fourth conveyor means distributing said mixture of said sludge and said composting material in even layers over entire area of said first silo by a concurrent matrix-like movement of said longitudinal movements of said first traveling carrier component, said transverse movements of said first traveling carriage element, and movements of said fourth conveyor means, said matrix-like deposition of said mixture being an evenly layered distribution without separation of the materials to fill said first silo with said mixture of said sludge and said composting agent;

a first material removal means, said first material removal means being located and installed within said first silo means, said first material removal means having a first horizontal screw conveyor component, said first horizontal screw conveyor component being located at the bottom end of said first silo means and being situated transversely thereto, said first horizontal screw conveyor component having a rack and pinion type element at each end of said first horizontal screw conveyor component, said rack and pinion element providing a longitudinal movement of said first horizontal screw conveyor component in relation to the transverse direction of said first silo, said first horizontal screw conveyor component being capable of cutting off successive bottom layers of the mixture of sludge and composting agent materials which has been processed through said first silo from said top end to said bottom end, said first horizontal screw conveyor component thereby transporting said cut off layers to one end thereof for discharge therefrom, said first material removal means having a fifth conveyor means, said fifth conveyor means being located at the discharge end of said first horizontal screw conveyor component, said fifth conveyor means transporting said discharged portion of processed mixture of sludge and composting agent materials to a subsequent dual discharge point for bulk disposal and for further processing;

a second silo means, said second silo means being connected to said first silo means by a sixth conveyor means, said sixth conveyor means receiving said processed mixture of sludge and composting agent from said further processing point of said dual discharge point and transporting said processed mixture to the top end of said second silo means for discharge therein;

a second material distribution means, said second material distribution means being located and installed within said second silo means at the uppermost end thereof, said second material distribution means having a second traveling carrier component, said second traveling carrier component being mounted and movably affixed within said second silo means so as to move longitudinally therewithin and having a second traveling carriage element mounted and movably affixed upon said second traveling carrier component so as to move transversely within said second silo and having a seventh conveyor means mounted and affixed upon said second traveling carriage element, said discharge of said processed mixture at said top end of said second silo being directed to said seventh conveyor means, said seventh conveyor means distributing said processed mixture in even layers over entire area of said second silo by a concurrent matrix-like movement of said longitudinal movements of said second traveling carrier component, said transverse movements of said traveling carriage element, and movements of said seventh conveyor means, said matrix-like deposition of said processed mixture being an evenly layered distribution without separation of the materials to fill said second silo with said processed mixture;

a second material removal means, said second material removal means being located and installed within said second silo means, said second material removal means having a second horizontal conveyor screw component, said second horizontal screw conveyor component being located at the bottom end of said second silo means and being situated transversely thereto, said second horizontal screw conveyor component having a rack and pinion type element at each end of said second horizontal screw conveyor component, said rack and pinion element providing a longitudinal movement of said second horizontal screw conveyor component in relation to the transverse direction of said second silo, said second horizontal screw conveyor component being capable of cutting off successive bottom layers of the processed mixture which has been processed through said second silo from said top end to said bottom end, said second horizontal screw conveyor component thereby transporting said cut off layers to one end thereof for discharge therefrom, said second material removal means having an eighth conveyor means, said eighth conveyor means being located at the discharge end of said second horizontal screw conveyor component, said eighth conveyor means transporting said discharged portion of said processed mixture to a subsequent dual discharge point for bulk distribution and for bagging for distribution.

2. A controlled sludge composting system as recited in claim 1, and additionally, a first monitoring means, said first monitoring means comprising a temperature monitoring means, a carbon dioxide monitoring means, and a moisture content monitoring means, said first monitoring means being connected to said first silo means.

3. A controlled sludge composting system as recited in claim 2, wherein said first monitoring means has a plurality of thermocouples located within said first silo means, said plurality of thermocouples being spaced vertically and horizontally within said first silo means.

4. A controlled sludge composting system as recited in claim 1, and additionally, a second monitoring means, said second monitoring means comprising a temperature monitoring means, a carbon dioxide monitoring means, and a moisture content monitoring means, said second monitoring means being connected to said second silo means.

5. A controlled sludge composting system as recited in claim 4, wherein said second monitoring system has a plurality of thermocouples located within said second silo means, said plurality of thermocouples being spaced vertically and horizontally within said second silo means.

6. A controlled sludge composting system as recited in claim 1, and additionally, a first air supply means, said first air supply means being connected to said first and second silo means.

7. A controlled sludge composting system as recited in claim 6, wherein said first air supply means is distributed over the entire transverse area of said first and second silo means, said air supply being passed through a bed of stone-like material situated at the base of and over the entire transverse area of said first and second silo means.

8. A controlled sludge composting system as recited in claim 1, and additionally, a second air supply means, said second air supply means being connected to said second silo means.

9. A controlled sludge composting system as recited in claim 1, wherein said first and second silos are rectangular in cross sectional configuration.

10. A controlled sludge composting system as recited in claim 9, wherein said silos in rectangular cross section configuration have sloping side walls, thereby being of lesser cross sectional area at the top than at the bottom.

* * * * *